United States Patent
Højsted

(10) Patent No.: US 7,296,049 B2
(45) Date of Patent: *Nov. 13, 2007

(54) FAST MULTIPLICATION CIRCUITS

(75) Inventor: Erik Højsted, Vanloese (DK)

(73) Assignee: Intel Corporation, Santa Clara, CA (US)

( * ) Notice: Subject to any disclaimer, the term of this patent is extended or adjusted under 35 U.S.C. 154(b) by 1019 days.

This patent is subject to a terminal disclaimer.

(21) Appl. No.: 10/140,284

(22) Filed: May 8, 2002

(65) Prior Publication Data

US 2003/0182343 A1 Sep. 25, 2003

(51) Int. Cl.
  *G06F 7/52* (2006.01)
(52) U.S. Cl. .................................... 708/625
(58) Field of Classification Search ............... 708/625, 708/700
  See application file for complete search history.

(56) References Cited

U.S. PATENT DOCUMENTS

| 4,208,722 | A | | 6/1980 | Rasala et al. | |
|---|---|---|---|---|---|
| 4,864,529 | A | | 9/1989 | Shah et al. | |
| 5,008,850 | A | | 4/1991 | Jensen | |
| 5,195,051 | A | * | 3/1993 | Palaniswami | 708/503 |
| 5,402,369 | A | | 3/1995 | Main | |
| 5,426,599 | A | * | 6/1995 | Machida | 708/630 |
| 5,442,576 | A | * | 8/1995 | Gergen et al. | 708/209 |
| 5,784,306 | A | * | 7/1998 | Ogletree | 708/603 |
| 5,974,435 | A | * | 10/1999 | Abbott | 708/523 |
| 6,115,732 | A | * | 9/2000 | Oberman et al. | 708/625 |
| 6,202,078 | B1 | * | 3/2001 | Kikuchi et al. | 708/628 |
| 6,298,369 | B1 | * | 10/2001 | Nguyen | 708/620 |

FOREIGN PATENT DOCUMENTS

| EP | 0 326 414 | 8/1989 |
|---|---|---|
| EP | 0 744 688 | 11/1996 |
| WO | WO 01/25899 | 4/2001 |

OTHER PUBLICATIONS

Patent Abstracts of Japan, vol. 1999, No. 08, Jun. 30, 1999, & JP 11 066045 (Oki Electric Ind Co Ltd), Mar. 9, 1999.
Walter, Colin D., "Faster Modular Multiplication by Operand Scaling", Computation Department, pp. 1-9, U.M.I.S.T., Manchester, England.

* cited by examiner

*Primary Examiner*—Chat C. Do
(74) *Attorney, Agent, or Firm*—Grossman, Tucker, Perreault & Pfleger, PLLC

(57) ABSTRACT

Fast multiplication of two operands may be achieved by an interstitial product generator that generates an interstitial product from each of a plurality of mult-ibit segments of a multiplier. Generation of a final product is made faster because fewer interstitial products are created than in prior systems and, therefore, summing of the interstitial products is faster. In one embodiment, an interstitial product generator is used having registers to store a multiplicand value ("A"), shifted values of A and a 3A value. A series of multiplexers and an inverter may generate interstitial product values from data in these registers. This embodiment is useful with four bit segments of the multiplicand.

18 Claims, 3 Drawing Sheets

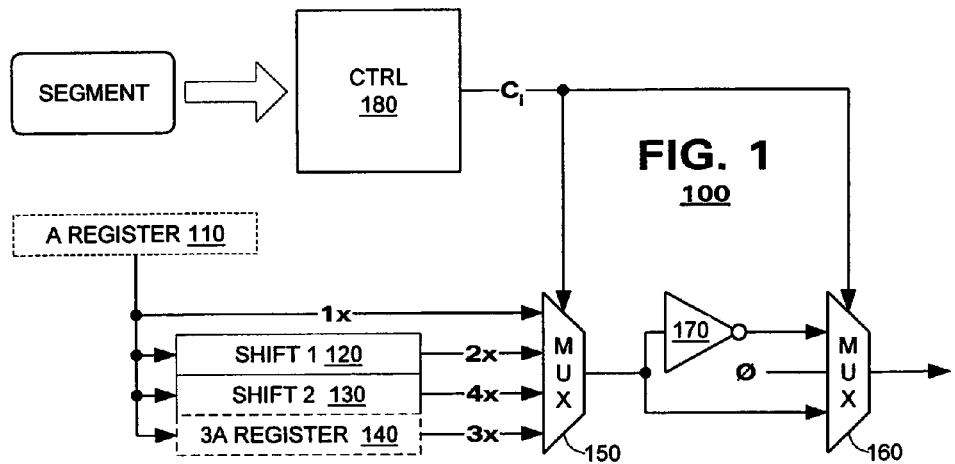
FIG. 1
100
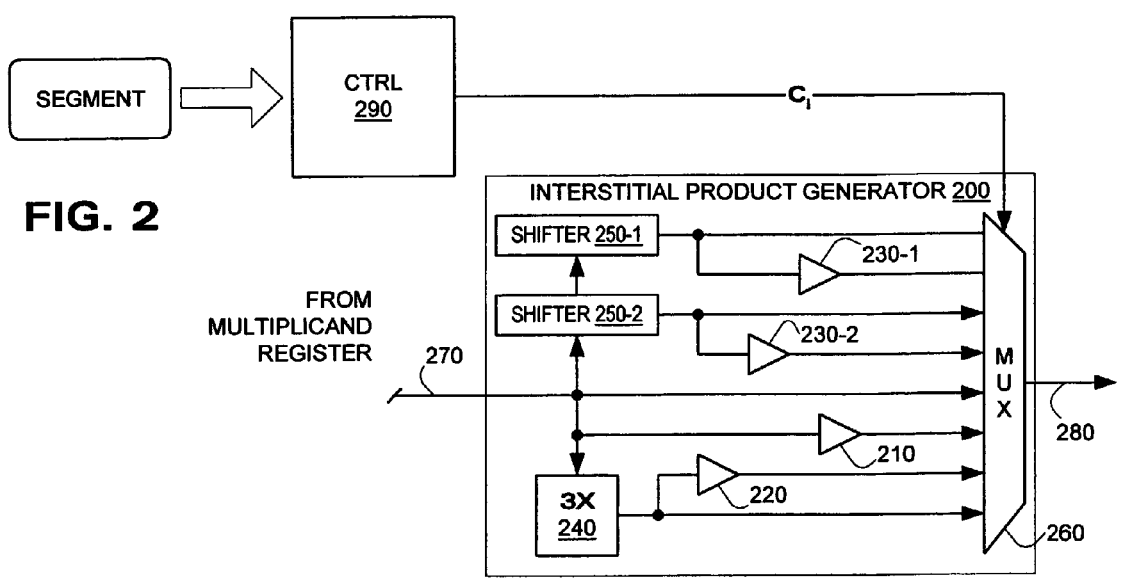
FIG. 2
MULTIPLIER B FIG. 3
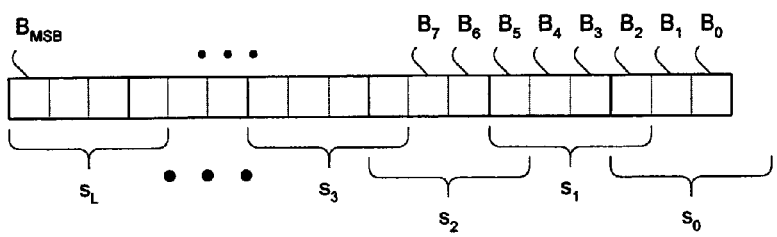

300

400

500

US 7,296,049 B2

FAST MULTIPLICATION CIRCUITS

BACKGROUND

Embodiments of the present invention relate to fast multiplication of operands, at least one of which may be very large.

In a traditional combinatorial multiplier, each bit position in a multiplier is multiplied against a multiplicand to generate an interstitial product. The interstitial product is summed with those from all other bit positions in the multiplier, each shifted so that the least significant bit coincides with the multiplier bit position from which the interstitial product originated, to generate a product.

In many applications, operands to a multiplication operation may be large binary numbers. For example, as part of the negotiations conducted during encrypted transactions, it is common to multiply operands of 1024 or 2048 bits. Multiplication typically involves a shift of a multiplier value A for each bit position of a multiplicand B and possibly an addition with a previously obtained interstitial product. Thus, for a multiplicand of length n, this involves n shifts and as many as n additions. For an extremely long multiplicand (1024 or 2048 bits), the bit-by-bit shifting operations is computationally expensive.

There is a need in the art for a fast multiplication technique for use with long operands. Further, there is a need for such a multiplication technique to be performed without the bit-by-bit processing of prior designs that is so expensive.

BRIEF DESCRIPTION OF THE DRAWINGS

FIG. 1 is a block diagram illustrating an interstitial product generator according to an embodiment of the present invention.

FIG. 2 is a block diagram illustrating an interstitial product generator according to another embodiment of the present invention.

FIG. 3 is a block diagram of an exemplary multiplier register.

DETAILED DESCRIPTION

Figure 4:
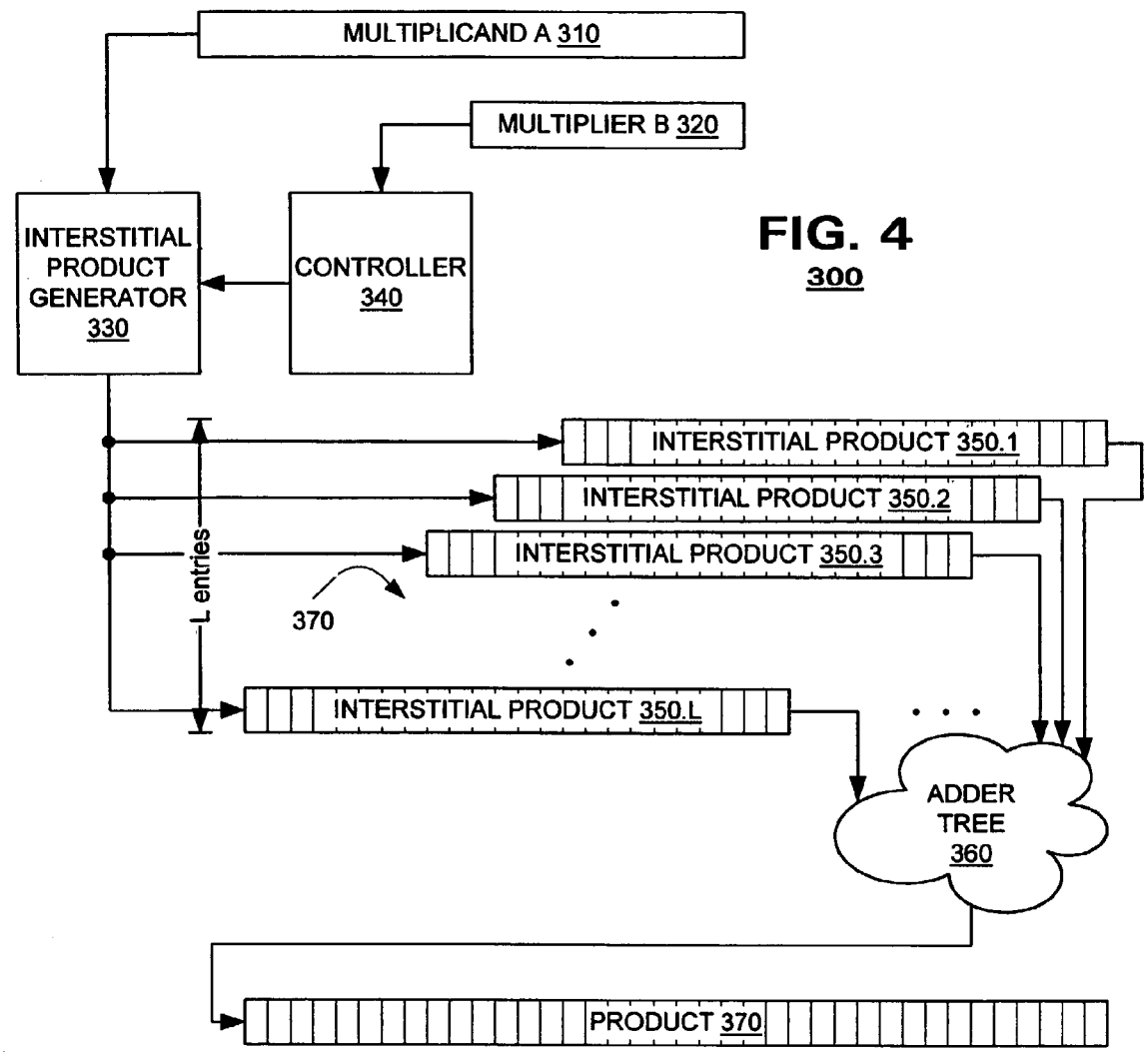
FIG. 4 illustrates a multiplier circuit according to an embodiment of the invention.

Embodiments of the present invention provide a multiplication circuit having reduced complexity over conventional multipliers. In the embodiment, a multiplication circuit generates a result from two operands (herein a "multiplicand" and a "multiplier"). Rather than generate an interstitial product for each bit position in a multiplier, a single interstitial product may be generated for a plurality of bit positions of the multiplier. Thus, summing across the interstitial products to obtain the product result is made easier because there are fewer interstitial products to sum.

FIG. 1 is a block diagram illustrating an interstitial product generator ("IPG") 100 according to an embodiment of the present invention. The IPG 100 generates an interstitial product from a multiplicand A. It may include a multiplicand register (called, an "A register" herein) 110, a pair of shift registers 120, 130 (labeled "shift 1" and "shift 2" respectively) and a "3A register" 140. The A register is illustrated in phantom because it may but need not be placed within the IPG 100 itself; alternatively, it may be provided in some other portion of an carry save adder but its contents may be provided as an input to the IPG. The IPG 100 also may include a pair of multiplexers (colloquially, "MUXes") 150, 160 and an inverter 170.

The 3A register 140, as its name implies, is a register to store a value representing three times the value in the A register. The values stored in this register may be obtain from a straightforward addition of the values from the A register 110 and the shift 1 register 120 or, alternatively, from a subtraction of the values in the shift 1 register 120 from the value in the shift 2 register 130. Circuitry to implement these functions is straightforward and omitted from the illustration of FIG. 1 to keep the illustration simple.

The 3A register 140, as its name implies, is a register to store a value representing three times the value in the A register. The values stored in this register may be obtain from a straightforward addition of the values from the A register 110 and the shift 1 register 120 or, alternatively, from a subtraction of the values in the shift 1 register 120 from the value in the shift 2 register 140. Circuitry to implement these functions is straightforward and omitted from the illustration of FIG. 1 to keep the illustration simple.

Outputs from the A register 110, the two shift registers 120 and 130 and the 3A register 140 may be input to the first MUX 150. An output from the first MUX 150 may be input to both the second MUX 160 and the inverter 170. An output from the inverter 170 may be provided as a second input to the second MUX 160. The inverter 170 may generate a two's complement inversion of the multibit output from the first MUX 150. The second MUX 160 may have a third input coupled directly to a zero value "Ø." Alternatively, the zero value could be input to the first MUX 150. Thus, given an input value A, the IPG 100 may generate any of the following outputs: A, $\overline{A}$, 2A, $\overline{2A}$, 3A, $\overline{3A}$, 4A, $\overline{4A}$ and Ø.

The IPG 100 may include a controller 180 that governs operation of the two MUXes 150, 160. As discussed below, given an input "segment," the controller 180 may generate a control signal (labeled $c_i$) that causes the MUXes 150, 160 to output a selected one of the possible outputs on each cycle of a driving clock (not shown).

FIG. 2 is a block diagram illustrating an IPG 200 according to an alternate embodiment of the present invention. According to an embodiment, the IPG 200 may include a plurality of inverters 210, 220, 230, a 3× multiplier 240, a shifter 250 and a multiplexer 260. In this embodiment, the IPG 200 is illustrated as connected to an external multiplicand register rather than including the multiplicand register as part of it. The multiplicand may be input to the IPG 200 on a first terminal 270 thereof. One of the inverters 210 may be coupled to the first terminal 270, to invert a multiplicand when presented.

The 3× multiplier, as its name implies, may generate a value that is three times a multiplicand when presented at the input terminal. A second inverter 220 may be coupled to the 3× multiplier 240 to invert the output thereof.

A shifter 250 also may be coupled to the input terminal 270. It may be provisioned to shift a multiplicand by one or two bit positions to the right. The third inverter may invert the output from the shifter 250. Outputs from the three inverters 210, 220, 230, the 3× multiplier 240 and the shifter 250 are input to the multiplexer 260.

The multiplexer 260 also may be controlled to output none of the inputs from the IPG 200. In this condition, the multiplexer 260 causes the IPG 200 to generate a zero output therefrom.

According to an embodiment, when it is desired to perform a multiplication based on a long multiplicand A and a shorter multiplier B, the multiplicand A may be loaded into the IPG 200. Values of A, 3A, $\overline{A}$ and $\overline{3A}$ will be available to the multiplexer 260 after a short initialization period. Similarly, shifted values of A and $\overline{A}$ also will be available to the multiplexer 260. Once these values are available, they may be retrieved from the IPG and forwarded to a remainder of a multiplication circuit (not shown in FIG. 2) based on values of multiplier segments.

The IPG may include a controller 290 responsive to these multiplier segments to cause the multiplexer 260 to retrieve one of the previously stored values from within the IPG. As is known, many multiplication circuits include controllers for other purposes. The controller 290 may be integrated into these known controllers or may be provided as a separate element as may be desired. FIG. 2 illustrates the controller 290 as being separate from the IPG 200 for convenience only.

In an embodiment, the multiplier B may be parsed into several four bit segments $s_i$. Each segment $s_i$ includes the bits $B_{3i+2}$–$B_{3i-1}$ from the multiplier B. From these segments, a control signal $c_i$ may be generated to determine which value from within the IPG should be output from the multiplexer. In an embodiment, the IPG may generate outputs according to the scheme shown in Table 1 below.

TABLE 1

| Input Pattern of Segment $s_i$ | $c_t$ | Interstitial Product |
|---|---|---|
| 0000 | 0 | 0 |
| 0001 | 1 | A |
| 0010 | 1 | A |
| 0011 | 2 | A << 1 |
| 0100 | 2 | A << 1 |
| 0101 | 3 | 3A |
| 0110 | 3 | 3A |
| 0111 | 4 | A << 2 |
| 1000 | -4 | $\overline{A << 2}$ |
| 1001 | -3 | $\overline{3A}$ |
| 1010 | -3 | $\overline{3A}$ |
| 1011 | -2 | $\overline{A << 1}$ |
| 1100 | -2 | $\overline{A << 1}$ |
| 1101 | -1 | $\overline{A}$ |
| 1110 | -1 | $\overline{A}$ |
| 1111 | 0 | 0 |

Where $\overline{A}$ is the two's complement of an input A. The control value $c_i$ may be related to the four bits input pattern by:

$$c_i = -4s_{i3} + 2s_{i2} + s_{i1} + s_{i0} \qquad (1.)$$

where $s_{ij}$ represents the $j^{th}$ bit position of segment $s_i$. For the segment $s_0$, the zero$^{th}$ bit position, which would be a fictional bit position "$B_{-1}$," may be set to 0 to render the response of the controller to segment $s_0$ consistent with Table 1.

It may be observed from FIG. 3 that a multiplier B will not fill all segments completely unless the length of the multiplier is a multiple of 3. In an embodiment, when the length of the multiplier is not a multiple of 3, it may be sign extended in sufficient length to fill an otherwise unused portion of the last segment. This typically involves copying the sign bit, the most significant bit $B_{MSB}$, to fill fictional bit positions beyond the most significant bit.

The IPG embodiments described above may be applied to multiplier circuits of a variety of architectures. In each application, use of an IPG permits the multiplier circuit to achieve faster operation essentially by permitting additions to occur once every three bit positions rather than once per bit position as is conventional.

FIG. 4 is a diagram of an application of an IPG in a combinatorial multiplier 300 according to an embodiment of the present invention. The combinatorial multiplier 300 may include first and second registers 310 for storage of a multiplicand A and a multiplier B respectively. It may include an IPG 330, a controller 340, a plurality of interstitial product registers 350.1-350.L and a product register 360. Addition circuitry 370 may be interposed among the interstitial product register 350.1-350.L and the product register 360. For clarity's sake the addition circuitry is shown in FIG. 4 by the plurality of interconnecting lines among the co-located bit positions of the various registers 350.1-350.L and 360.

During operation, the IPG 330 may be initialized to create the values A, $\overline{A}$, 3A and $\overline{3A}$ and shifted values of A and $\overline{A}$. The controller 340 may parse the multiplier B into segments and, responsive to the bit pattern in each segment, cause the IPG 330 to load one of the values into a corresponding interstitial product register (say, 350.1). In an embodiment, the number of interstitial product registers 350.1-350.L may be based upon the number of segments supported by the multiplier B. Thus, the number of interstitial product registers 350.1-350.L may be tied to the length of the multiplier register 320.

Once values are loaded in each of the interstitial product registers 350.1-350.L, the combinatorial multiplier 300 may cause a final product to be stored in the product register 360 by summing across all the interstitial product registers 350.1-350.L.

In an embodiment for a multiplicand A of length m and a multiplier B of length n, the product register 360 may have a length n+m just as in the traditional combinatorial multiplier. Interstitial product registers 350.1-350.L may have a length m+2 whereas in traditional combinatorial multipliers, they would have a length m.

Traditional combinatorial multipliers include one interstitial product register for each bit position of a multiplier B. In the foregoing embodiment, there need be only one interstitial product register (say, 350.1) for every three bit positions of the multiplier B. Thus, because the combinatorial multiplier 300 of the foregoing embodiments include approximately one-third the number of interstitial registers than conventional counterparts, the present embodiment is expected to generate results approximately three times as fast as the conventional circuits. Products are expected to be generated faster in the present embodiment because the final addition is carried out across fewer interstitial registers and, therefore, is available more quickly.

Figure 5:
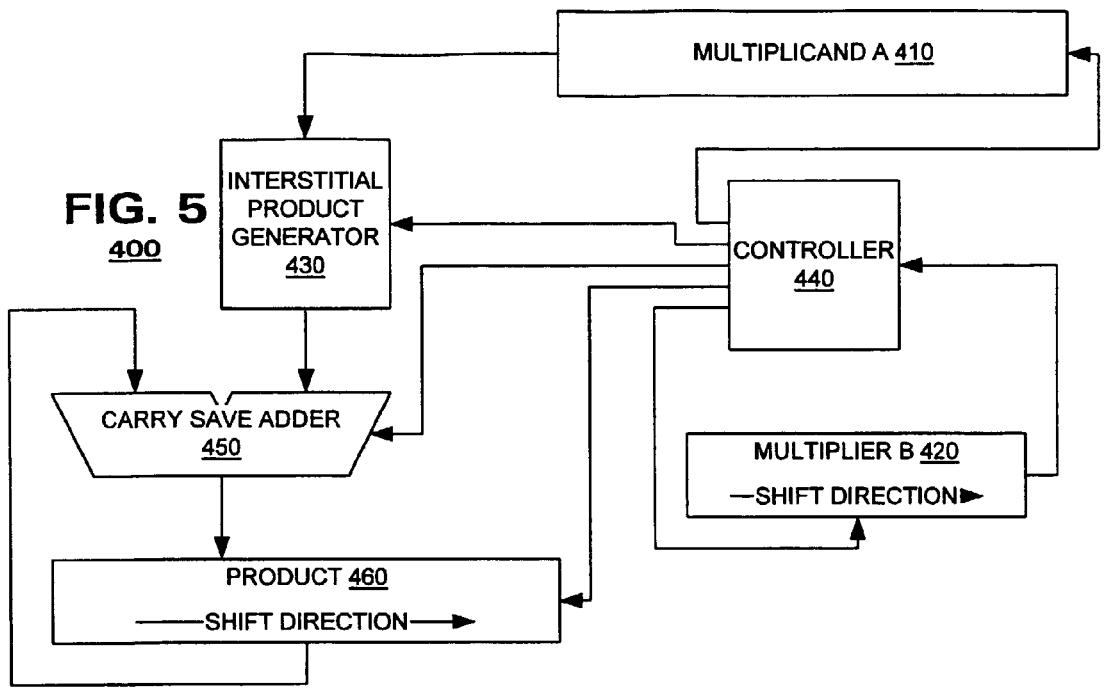
FIG. 5 illustrates a multiplier circuit according to another embodiment of the invention.

FIG. 5 is a block diagram of an application of an IPG integrated with a shift-add multiplier circuit 400 according to an embodiment of the present invention. The multiplier circuit 400 may include a pair of registers 410, 420 for storage of the multiplicand A and the multiplier B. The shift-add multiplier circuit 400 also may include an IPG 430, a controller, a carry save adder 450 and a product register 460.

During operation, the multiplier circuit 400 may be initialized. In this embodiment, the product register 460 may be cleared to zero and the interstitial product generator 430 may be loaded with the value of the multiplicand A. Thereafter, during operation, the controller 440 may read each segment from the multiplier register 420 and cause a selected value to be output from the IPG 430 to a first input of the carry save adder 450. The most significant bits from the product register 460 may be input to a second input of the carry save adder. The carry save adder 450 may add the values presented on each of its two inputs together and write the value back to the product register 460. Once the product register 460 is overwritten by the new value, it may be downshifted by three bit positions. The process may repeat for as many segments as are supported by the multiplier B.

As in the embodiment of FIG. 4, the embodiment of FIG. 5 provides for improved performance over traditional shift-add multiplier circuits. The traditional circuits perform an addition for each bit position of a multiplier B. By contrast, the embodiment shown in FIG. 5, provides an addition only once for every three bit positions of the multiplier B. Again, a fewer number of additions permit the shift-add multiplier of FIG. 5 to generate multiplication products in a shorter amount of time than would be available from traditional circuits.

Figure 6:
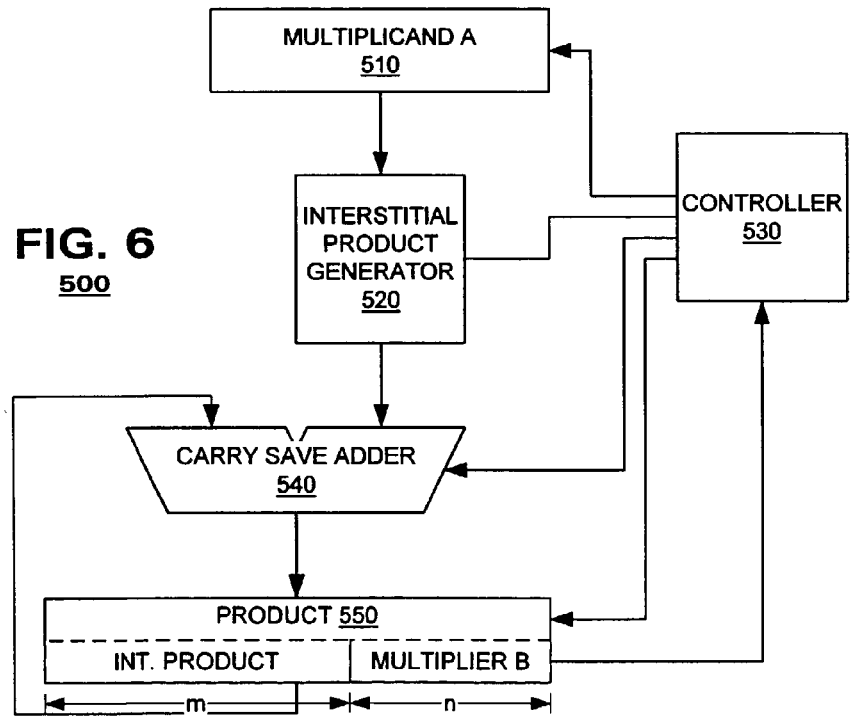
FIG. 6 illustrates a multiplier circuit according to a further embodiment of the invention.

In another embodiment, a multiplier circuit may omit use of a multiplier register (such as the multiplier 420 of FIG. 5). FIG. 6 illustrates a multiplier 500 populated by a multiplicand register 510, an IPG 520, a controller 530, an carry save adder 540 and a product register 550. A multiplicand value may be input to the IPG 520 as an initialization step. Additionally, a multiplier value (B) may be loaded into the least significant bit positions of the product register 550.

On each clock cycle, the contents of the product register 550 may be downshifted by three bit positions. When the least significant bits of the product register are shifted out of the product register, they may be input to the controller 530. In response to these three bits (and one bit from the shift of a prior clock cycle), the controller 530 may cause the IPG 520 to generate an output as shown above in Table 1. The IPG output is provided to a first input of the carry save adder 540. The downshifted value from the product register may be provided to a second input of the carry save adder 540. The carry save adder 540 may add the two input values and store them to the product register in the most significant bit positions. Again, this embodiment provides improved performance over other shift-add multipliers that operate a single bit shift at a time.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. An interstitial product generator, comprising:
    a first shift register configured to output a multiplicand A having been shifted by one bit, wherein the multiplicand comprises an operand having at least 1024 bits,
    a second shift register configured to output the multiplicand A having been shifted by two bits,
    a 3× multiplier register configured to output 3A,
    a first multiplexer having inputs coupled to a source of the multiplicand A, to the first shift register, to the second shift register, and to the 3× multiplier register and configured to output the multiplicand A, A<<1, A<<2, or 3A, in response to a control signal based on a segment of a multiplier B,
    an inverter configured to generate a two's complement inversion of an output of the first multiplexer,
    a second multiplexer having inputs coupled to the output of the first multiplexer and to an output of the inverter and configured to output the multiplicand A, A<<1, A<<2, or 3A, or a two's complement of A, A<<1, A<<2, or 3A, or zero, in response to the control signal, and
    memory configured to store an output of the second multiplexer as an interstitial product.

2. The interstitial product generator of claim 1, further comprising a controller having a control output coupled to the two multiplexers and configured to generate the control signal based on the segment of the multiplier B.

3. The interstitial product generator of claim 2 for use in a multiplier, wherein the controller has a control input coupled to a multiplier data source.

4. The interstitial product generator of claim 1, further comprising:
    a first inverter coupled to said source of the multiplicand value A;
    a second inverter coupled to an output of said first shift register;
    a third inverter coupled to an output of said second shift register; and
    a fourth inverter coupled to an output of said 3× multiplier register;
    wherein said first multiplexer further has inputs coupled to outputs of the fourth inverters.

5. The interstitial product generator of claim 4, further comprising a controller having a control output coupled to the first multiplexer.

6. The interstitial product generator of claim 5 for use in a multiplier, wherein the controller has a control input coupled to a multiplier data source.

7. A multiplication circuit, comprising:
    an interstitial product generator coupled to a multiplicand data source storing a multiplicand A having at least 1024 bits, the interstitial product generator comprising a first shift register configured to output the multiplicand A having been shifted by one bit, a second shift register configured to output the multiplicand A having been shifted by two bits, a 3× multiplier register configured to output 3A, a first multiplexer having inputs coupled to the multiplicand data source, to the first shift register, to the second shift register, and to the 3× multiplier register and configured to output the multiplicand A, A<<1, A<<2, or 3A, in response to a control signal based on a segment of a multiplier B, an inverter configured to generate a two's complement inversion of an output of the first multiplexer, and a second multiplexer having inputs coupled to the output of the first multiplexer and to an output of the inverter and configured to output the multiplicand A, A<<1, A<<2, or 3A, or a two's complement of A, A<<1, A<<2, or 3A, or zero, in response to the control signal, a controller, coupled to a multiplier data source and configured to be iteratively controlled by a four-bit segment thereof, having a control output coupled to the interstitial product generator, a plurality of interstitial product registers, each in communication with the interstitial product generator and each configured to store an interstitial product generated by the interstitial product generator, and a product register, coupled to each of the interstitial product registers and configured to store a sum of at least two of the interstitial products.

8. The multiplication circuit of claim 7, the interstitial product generator comprising:

an input terminal coupled to the multiplicand data source,
a shifter coupled to the input terminal,
a 3× multiplier coupled to the first input terminal,
a first inverter coupled to the first input terminal,
a second inverter coupled to an output of the shifter,
a third inverter coupled to an output of the 3× multiplier, and
a multiplexer, coupled to: the input terminal, the output of the shifter, the output of the 3× multiplier and to each of the three inverters.

9. A multiplication circuit, comprising:

an interstitial product generator coupled to a multiplicand data source storing a multiplicand A having at least 1024 bits, the interstitial product generator comprising a first shift register configured to output the multiplicand A having been shifted by one bit, a second shift register configured to output the multiplicand A having been shifted by two bits, a 3× multiplier register configured to output 3A, a first multiplexer having inputs coupled to the multiplicand data source, to the first shift register, to the second shift register, and to the 3× multiplier register and configured to output the multiplicand A, A<<1, A<<2, or 3A, in response to a control signal based on a segment of a multiplier B, an inverter configured to generate a two's complement inversion of an output of the first multiplexer, and a second multiplexer having inputs coupled to the output of the first multiplexer and to an output of the inverter and configured to output the multiplicand A, A<<1, A<<2 or 3A, or a two's complement of A, A<<1, A<<2 or 3A, or zero, in response to the control signal, a controller, coupled to a multiplier data source and configured to be iteratively controlled by a four-bit segment thereof, having a control output coupled to the interstitial product generator, a carry save adder having first and second inputs, the first input coupled to the interstitial product generator, and a product shift register coupled to the carry save adder and configured to store an output of the carry save adder, wherein most significant bits of the product shift register are coupled to the second input of the carry save adder.

10. The multiplication circuit of claim 9, interstitial product generator comprising:

an input terminal coupled to the multiplicand data source,
a shifter coupled to the input terminal,
a 3× multiplier coupled to the first input terminal,
a first inverter coupled to the first input terminal,
a second inverter coupled to an output of the shifter,
a third inverter coupled to an output of the 3× multiplier, and
a multiplexer, coupled to: the input terminal, the output of the shifter, the output of the 3× multiplier and to each of the three inverters.

11. A multiplication circuit, comprising:

an interstitial product generator coupled to a multiplicand data source storing a multiplicand A having at least 1024 bits, the interstitial product generator comprising a first shift register configured to output the multiplicand A having been shifted by one bit, a second shift register configured to output the multiplicand A having been shifted by two bits, a 3× multiplier register configured to output 3A a first multiplexer having inputs coupled to the multiplicand data source, to the first shift register, to the second shift register, and to the 3× multiplier register and configured to output the multiplicand A, A<<1, A<<2or 3A in response to a control signal based on a segment of a multiplier B, an inverter configured to generate a two's complement inversion of an output of the first multiplexer, and a second multiplexer having inputs coupled to the output of the first multiplexer and to an output of the inverter and configured to output the multiplicand A, A<<1, A<<2or 3A or a two's complement of A, A<<1, A<<2, or 3A or zero, in response to the control signal, a controller, coupled to a multiplier data source and configured to be iteratively controlled by a four-bit segment thereof, having a control output coupled to the interstitial product generator, a carry save adder having first and second inputs, the first input coupled to the interstitial product generator, and a product shift register coupled to the carry save adder and configured to store an output of the carry save adder, wherein
  most significant bits of the product shift register are coupled to the second input of the carry save adder, and
  a least significant bit space of the product shift register is configured to initially store a multiplier.

12. The multiplication circuit of claim 11, the interstitial product generator comprising:

an input terminal coupled to the multiplicand data source,
a shifter coupled to the input terminal,
a 3× multiplier coupled to the first input terminal,
a first inverter coupled to the first input terminal,
a second inverter coupled to an output of the shifter,
a third inverter coupled to an output of the 3× multiplier, and
a multiplexer, coupled to: the input terminal, the output of the shifter, the output of the 3× multiplier and to each of the three inverters.

13. A multiplication method comprising:

outputting from a first shift register, a multiplicand A having been shifted by one bit, wherein the multiplicand comprises an operand having at least 1024 bits, outputting from a second shift register, the multiplicand A having been shifted by two bits, outputting from a 3× multiplier register 3A, outputting from a first multiplexer the multiplicand A, A<<1, A<<2, or 3A, in response to a control signal based on a segment of a multiplier B, said first multiplexer having inputs coupled to a source of the multiplicand A, to the first shift register, to the second shift register, and to the 3× multiplier register, generating a two's complement inversion of an output of the first multiplexer by an inverter, outputting from a second multiplexer the multiplicand A, A<<1, A<<2, or 3A, or a two's complement of A, A<<1, A<<2, or 3A, or zero, in response to the control signal, said second multiplexer having inputs coupled to the output of the first multiplexer and to an output of the inverter, iteratively, for each three-bit segment of the multiplier B, adding to an interstitial product the output from the second multiplexer, wherein the addition occurs at a bit position of the interstitial product determined by a position of the segment, and storing the interstitial product in memory.

14. The multiplication method of claim 13, wherein the multiplication is accomplished in an unsigned combinatorial multiplier.

15. The multiplication method of claim 13, the multiplication is accomplished in a shift-add multiplier.

16. The multiplication method of claim 13, wherein the method is performed in an integrated circuit and each iteration occurs once per cycle of a driving clock.

17. The multiplication method of claim 13, wherein the initial value is selected as determined by a lookup table, considering the value of the three bit segment and a value of a bit position adjacent to the three bit segment.

18. The multiplication method of claim 13, wherein the initial value is selected according to a control value $c_i$, governed by:

$$c_i = -4s_{i3} + 2s_{i2} + s_{i1} + s_{i0}$$

wherein $s_{i3}$, $s_{i2}$ and $s_{i1}$ are values from within the three bit segment and $s_{i0}$ is a value of a bit position adjacent to the three bit segment.

* * * * *

UNITED STATES PATENT AND TRADEMARK OFFICE
CERTIFICATE OF CORRECTION

PATENT NO. : 7,296,049 B2  
APPLICATION NO. : 10/140284  
DATED : November 13, 2007  
INVENTOR(S) : Hojsted Page 1 of 1

It is certified that error appears in the above-identified patent and that said Letters Patent is hereby corrected as shown below:

In column 7, line 51, in Claim 9, after "A<<2" insert -- , --.

In column 7, line 51, in Claim 9, after "A<<1, A<<2" insert -- , --.

In column 7, line 64, in Claim 10, after "9," insert -- the --.

In column 8, line 17, in Claim 11, after "3A" insert -- , --.

In column 8, line 21, in Claim 11, delete "A<<2or 3A" and insert -- A<<2, or 3A, --, therefor.

In column 8, line 28, in Claim 11, delete "A<<2or 3A" and insert -- A<<2, or 3A, --, therefor.

In column 8, line 29, in Claim 11, after "3A" insert -- , --.

In column 10, line 1, in Claim 15, after "13," insert -- wherein --.

Signed and Sealed this

Fifteenth Day of July, 2008

JON W. DUDAS  
*Director of the United States Patent and Trademark Office*